United States Patent [19]

Wickmann et al.

[11] Patent Number: 4,942,666
[45] Date of Patent: Jul. 24, 1990

[54] APPARATUS FOR MEASURING CAMBER, CASTER AND STEERING AXIS INCLINATION OF A VEHICLE

[75] Inventors: John T. Wickmann, Omemee; Phillip Carlton, Bowmanville, both of Canada

[73] Assignee: Chart Industries Ltd., Pickering, Canada

[21] Appl. No.: 442,150

[22] Filed: Nov. 28, 1989

[51] Int. Cl.⁵ .......................... G01B 5/25; G01B 5/255
[52] U.S. Cl. ................................ 33/203.18; 33/203.19; 33/203.2; 33/288
[58] Field of Search ............. 33/203.18, 203.19, 203.2, 33/288, 600, 370, 371, 374, 375, 391, 395

[56] References Cited

U.S. PATENT DOCUMENTS

| | | | |
|---|---|---|---|
| 1,530,832 | 6/1925 | Johnston | 33/203.18 |
| 3,956,830 | 5/1976 | MacMillan | 33/203.18 |
| 4,453,315 | 6/1984 | Mosiman et al. | 33/600 |
| 4,569,140 | 2/1986 | Hobson | 33/203.18 |
| 4,640,015 | 2/1987 | Mason | 33/203.18 |

Primary Examiner—Allan N. Shoap
Assistant Examiner—Alvin Wirthlin
Attorney, Agent, or Firm—James R. Longacre; Michael L. Keller

[57] ABSTRACT

An apparatus that enables simultaneous readings of the camber, caster and steering axis inclination of the steering components of a front wheel suspension of a vehicle; the apparatus comprises a C-shaped upright, the upper and lower extremities of which engage the upper and lower steering pivots of the component. A carriage, slidably mounted on the upright, supports a yoke member which is adapted to bear against the hub assembly of the vehicle wheel. A first gauge is mounted to the yoke member to give a camber reading of the strut while second and third gauges are mounted on the carriage to give a caster reading and a steering axis inclination reading.

10 Claims, 2 Drawing Sheets

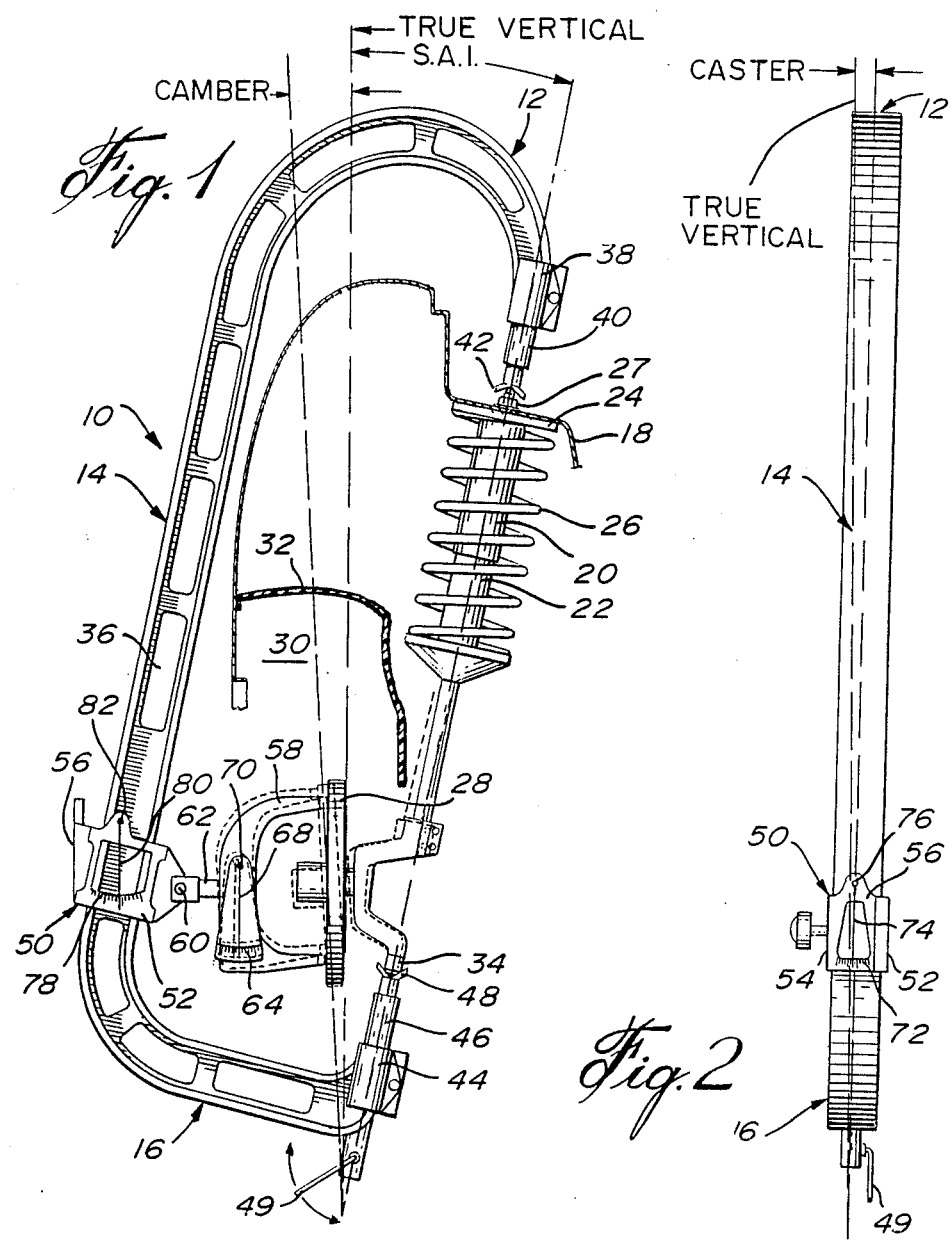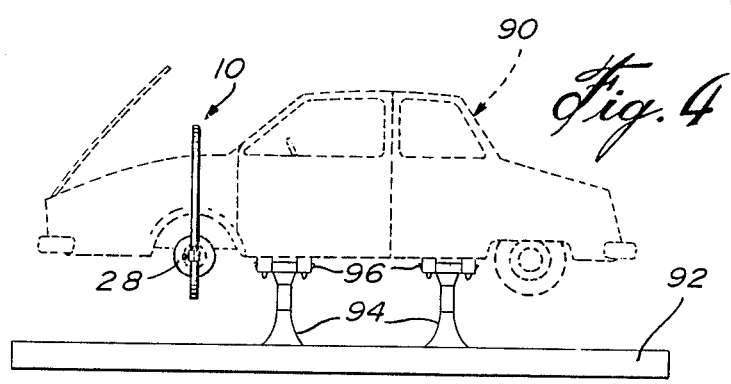

APPARATUS FOR MEASURING CAMBER, CASTER AND STEERING AXIS INCLINATION OF A VEHICLE

FIELD OF THE INVENTION

The present invention relates to an apparatus for assisting in the repair of damaged vehicles. More particularly, the invention relates to an apparatus that enables simultaneous readings of the camber, caster and steering axis inclination (S.A.I.) of steering components that form part of the front wheel suspension of a vehicle. Furthermore, the invention is particularly relevant to vehicles equipped with McPherson-type strut assemblies.

BACKGROUND OF THE INVENTION

The front suspension system and supporting structures of a damaged vehicle must be checked to determine the real positions of the struts or other steering components with respect to the axle with a view to correcting any misalignment of struts or components that do not conform to specifications.

Three values must be examined in order to effect a correct alignment: the caster, the camber and the steering axis inclination. The caster is the angular relationship between the upper steering pivot and the lower steering pivot defined along the steering axis as viewed from the side of the vehicle; caster is measured in degrees from true vertical. The camber is the inward or outward tilt of the wheel as viewed from the front of the vehicle; camber is measured in degrees from true vertical. The steering axis inclination is the angle of an imaginary line through the upper steering pivot and the lower steering pivot of the steering axis as viewed from the front of the vehicle; this inclination is measured in degrees from true vertical.

Strut alignment gauges exist. For example, U.S. Pat. No. 4,453,315 issued June 12, 1984 to Mosiman et al, U.S. Pat. No. 4,498,242 issued Feb. 12, 1985 to Celette and U.S. Pat. No. 4,640,015 issued Feb. 3, 1987 to Mason all describe various types of gauges for measuring the displacement of automobile components with particular emphasis on the checking of the angular disposition of McPherson-type struts. The apparatus described in these patents allow the measurement of one or more of angles, such as camber, caster, toe-in and alignment. None, however, pertains to an apparatus which will measure the steering axis inclination and none enables the simultaneous measurements of caster, camber and steering axis inclination.

OBJECTS AND STATEMENT OF THE INVENTION

It is an object of the present invention to provide an apparatus that will allow simultaneous readings of the camber, caster and steering axis inclination of a vehicle's steering component. This is achieved by accurately positioning the apparatus to the upper and lower steering pivots of the steering axis.

To this end, the apparatus of the present invention, therefore, comprises: an upright having an upper part and a lower part; first engaging means at the upper part adapted to engage the upper steering pivot; second engaging means at the lower part adapted to engage the lower steering pivot; third engaging means having a first part adjustably mounted to the upright and a second part adapted to bear against the vehicle hub assembly; first gauge means mounted on the second part for giving a camber reading of the hub assembly; second gauge means mounted on the upright for giving a caster reading of the steering axis; and third gauge means mounted on the upright for giving a steering axis inclination reading of the steering axis.

In one preferred form of the invention, the gauge means each consist of a graduated scale and of an indicator pointer which is freely suspended in front of the scale to give the respective readings.

In another form of the invention, the first part of the third engaging means consists of a carriage slidably mounted on the upright while the second part is a yoke pivotally mounted to the carriage and longitudinally adjustable relative thereto to be positioned accurately against the brake rotor plate.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

FIG. 1 is a side elevational view of the apparatus of the present invention shown mounted to the upper and lower steering pivots of a McPherson-type strut;

FIG. 2 is a front elevational view of the apparatus shown in FIG. 1;

FIG. 4 is an elevation view showing the apparatus of the present invention mounted on a vehicle.

DESCRIPTION OF PREFERRED EMBODIMENTS

Figure 3:
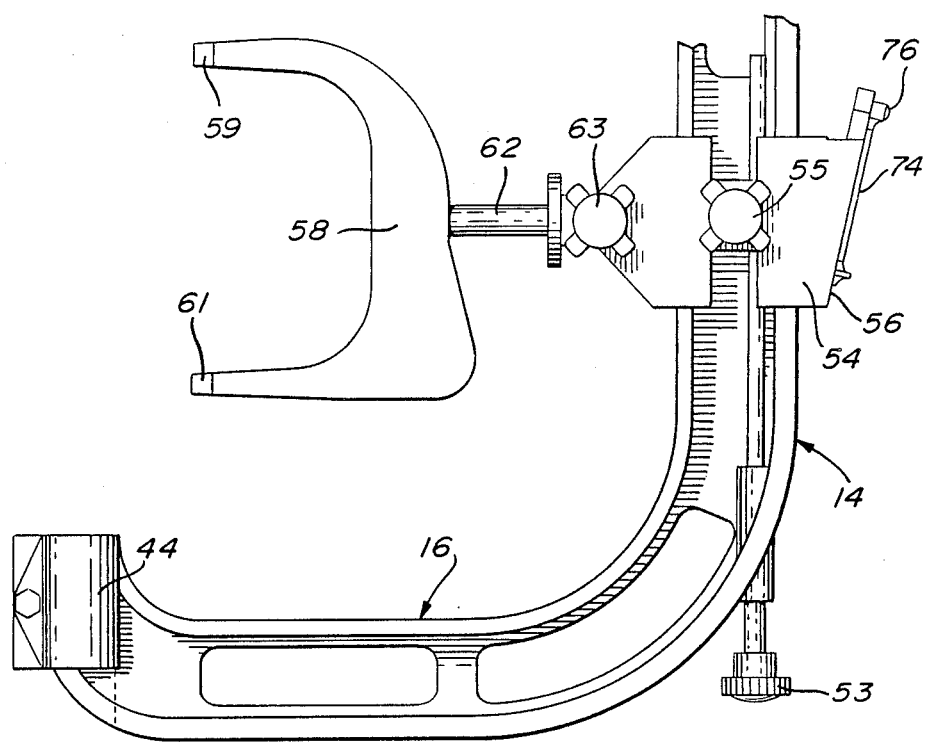
FIG. 3 is an enlarged side view of the lower part of the upright as seen from the left of FIG. 2.

Referring to FIG. 1, the apparatus of the present invention comprises a C-shaped upright 10 including a curved upper part 12, a straight intermediate part 14 and a curved lower part 16. The upright is shown mounted to a conventional vehicle steering component, such as a McPherson-type strut, which provides spring suspension for a wheel assembly. The strut is mounted to and within fixed strut towers 18, which are also referred to as the front inner sheet metal of the vehicle. The strut comprises two telescopic tubes 20 and 22, the outer tube carrying a seat or bearing plate 24 against which bears a coil spring 26. The vehicle front wheel (not shown) is attached to a hub assembly that includes a brake rotor disc plate 28 within the vehicle wheel well 30 defined by a mud-guard 32. The lower end of the strut is the lower steering pivot which is represented by reference numeral 34 and is, in most cases, a lower ball joint.

The upright 10 is I-shaped in cross-section, the inner face of which displays a series of elongated openings 36 to reduce weight. The upper part 12 includes a cylindrical bracket 38 for mounting an upper locator 40 displaying a cup-shaped extremity 42 for engaging the upper projecting bolt 27 of the top plate 24 of the strut. The lower part 16 of the upright also includes a cylindrical bracket 44 for mounting a spring-loaded locator 46 having a cup-shaped extremity 48 to engage the lower ball joint 34 of the strut. A lever 49 is used to lock the lower locator as described below.

Adapted to slide along the intermediate portion 14 of the upright is a carriage 50 having opposite side walls 52 and 54 (FIG. 2) and a front wall 56. Referring to FIG. 3, a lead screw 53 enables the vertical displacement of the carriage along the intermediate portion 14 of the upright while a lock screw 55 secures the carriage in the desired vertical position.

A C-shaped yoke 58 with fingers 59 and 61 is pivotally mounted at 60 to the inner side of the carriage 50. This member 58 is longitudinally adjustable relative to the carriage through the use of a lead screw 62. A lock screw 63 secures the yoke in the desired angle relative to the upright. The upper and lower fingers 59 and 61 of the yoke are adapted to contact the outer face of the rotor plate 28 by adjusting the lead screw 62.

A first gauge is mounted on the yoke member 58 for providing a reading of the camber of the hub assembly; it consists of a scale 64 and of a pointer 68 which is freely suspended from its upper pivot axis 70 (see FIG. 1).

A second gauge for measuring the caster of the steering axis is provided on the front wall 56 of the carriage 50 and consists of a scale 72 and of a pointer 74 which is freely suspended from its upper pivot axis 76 (see FIG. 2).

A third gauge is provided on the carriage 50 for measuring the steering axis inclination and consists of a scale 78 and of a pointer 80 which is freely suspended from its upper pivot axis 82.

As illustrated in FIGS. 1 and 2, the measurement of the caster, camber and the steering axis inclination is always done with respect to a true vertical.

As illustrated in FIG. 4, the measuring apparatus 10 is mounted to a vehicle 90 which is supported over a rack or base 92 by means of a series of stands 94. However, since measurement is accomplished simply through the movements of pointers 68, 74 and 80 acting under gravity, the vehicle must be levelled in order to obtain accurate readings. To achieve this, ride height must first be established before mounting the vehicle on the stands 94; ride height is measured from the center of wheel spindle to a point on the vehicle body; if the body is badly damaged, it is measured from the rack (or floor) to the spindle center. A further measurement is made from the underbody structure of the vehicle to the rack (or floor) on all four corners of the vehicle. The vehicle is then mounted on the anchor stands 94. A measurement is made from the underbody structure of the vehicle to the rack (or floor) while the vehicle is mounted on the stands. Once correct measurements have been established on all four corners of the vehicle, anchor clamps 96 are tightened. Using a jack or other lifting device, the suspension is raised by compressing the strut until the correct ride height dimension is established.

The operation of the apparatus of the present invention may now be used.

The lock lever 49 is positioned such as the lower locator 48 retracts into the shaft 46. The upright is then positioned by placing the top locator 42 onto the center bolt 27 of the strut. The extremity of the lower locator 48 is then slid up until it contacts the lower ball joint 34. The lock lever 49 is again actuated so as to extend the spring loaded locator 48 to preload the apparatus securely to the strut. The camber yoke 58 is pivoted to read approximately 0 degree. The lock screw 55 is loosened and the carriage 50 is positioned to the approximate center of the rotor plate 28 by manually operating the lead screw 53; then, the lock screw 55 is secured. Then, the camber lock screw 63 is loosened and the yoke is moved towards the rotor plate by turning the lead screw 62. When the yoke touches the plate, it is pivoted until both fingers 59 and 61 contact the rotor plate. The lock screw 63 is tightened locking the yoke. An accurate reading of the camber, caster and steering axis inclination can be made and compared to measurements found in manuals.

Although the invention has been described above with respect to one specific form, it will be evident to the person skilled in the art that it may be modified and refined in various ways. It is therefore wished to have it understood that the present invention should not be limited in scope, except by the terms of the following claims.

The embodiments of the invention in which an exclusive property or privilege is claimed are defined as follows:

1. An apparatus for enabling simultaneous readings of the camber, caster and steering axis inclination of steering components that form part of a front wheel suspension of a vehicle equipped with a hub assembly, the steering components including upper and lower steering pivots defined along a steering axis; said apparatus comprising:
   an upright having an upper part and a lower part;
   first engaging means at said upper part adapted to engage said upper steering pivot;
   second engaging means at said lower part adapted to engage said lower steering pivot;
   third engaging means having a first part adjustably mounted on said upright and a second part adapted to bear against said hub assembly;
   first gauge means mounted on said second part for giving a camber reading of the hub assembly;
   second gauge means mounted on said upright for giving a caster reading of the steering axis; and
   third gauge means mounted on said upright for giving a steering axis inclination reading.

2. An apparatus as defined in claim 1, wherein said first part of said third engaging means consists of a carriage slidably mounted on said upright.

3. An apparatus as defined in claim 2, wherein said second part of said third engaging means is pivotally and adjustably mounted to said carriage.

4. An apparatus as defined in claim 3, wherein said second part of said third engaging means consists of a yoke member having its free extremities adapted to contact said hub assembly.

5. An apparatus as defined in claim 2, wherein said second gauge means consist of a graduated scale displayed on a first side wall of said carriage and of an indicator pointer freely suspended in front of said scale.

6. An apparatus as defined in claim 5, wherein said third gauge means consist of a graduated scale displayed on a second side wall of said carriage and of an indicator pointer freely suspended in front of said scale.

7. An apparatus as defined in claim 1, wherein said upright is C-shaped, the extremities of the upper and lower parts thereof each carrying said means for engaging the upper and lower steering pivots.

8. An apparatus as defined in claim 7, further comprising spring-loaded means mounted on said lower part of said upright for tightly securing said upper and lower parts to said steering components when engaged thereon.

9. An apparatus as defined in claim 1, wherein said first gauge means consist of a graduated scale displayed on said second part of said third engaging means and of an indicator pointer freely suspended in front of said scale.

10. An apparatus as defined in claim 1, wherein said steering components are McPherson-type struts.

* * * * *